United States Patent [19]

Engel et al.

[11] Patent Number: 4,594,993
[45] Date of Patent: Jun. 17, 1986

[54] DEVICE FOR RECIRCULATING EXHAUST GAS IN AN INTERNAL COMBUSTION ENGINE

[75] Inventors: Gerhard Engel; Hans C. Engelbrecht, both of Stuttgart; Wolf Wessel, Oberriexingen, all of Fed. Rep. of Germany

[73] Assignee: Robert Bosch GmbH, Stuttgart, Fed. Rep. of Germany

[21] Appl. No.: 529,533

[22] Filed: Sep. 6, 1983

[30] Foreign Application Priority Data

Sep. 8, 1982 [DE]   Fed. Rep. of Germany ....... 3233290

[51] Int. Cl.$^4$ ............................................ F02M 25/06
[52] U.S. Cl. ..................................... 123/571; 123/569
[58] Field of Search .............. 123/569, 568, 571, 357, 123/440

[56] References Cited

U.S. PATENT DOCUMENTS

| | | | |
|---|---|---|---|
| 4,174,689 | 11/1979 | Hosaka | 123/440 |
| 4,279,235 | 7/1981 | Flaig et al. | 123/569 |
| 4,280,470 | 7/1981 | Ueda | 123/569 |
| 4,333,738 | 6/1982 | Perez et al. | 123/569 |
| 4,369,753 | 1/1983 | Sugiyama | 123/569 |
| 4,378,777 | 4/1983 | Iida et al. | 123/571 |
| 4,388,909 | 6/1983 | Ogasawara et al. | 123/569 |
| 4,428,355 | 1/1984 | Yokooku | 123/569 |
| 4,433,667 | 2/1984 | Ripper | 123/569 |

FOREIGN PATENT DOCUMENTS

| | | | |
|---|---|---|---|
| 2443582 | 8/1980 | France | 123/569 |
| 0129747 | 10/1981 | Japan | 123/569 |
| 0026254 | 2/1982 | Japan | 123/569 |
| 0026256 | 2/1982 | Japan | 123/569 |
| 0026257 | 2/1982 | Japan | 123/569 |

Primary Examiner—W. R. Wolfe
Attorney, Agent, or Firm—Michael J. Striker

[57] ABSTRACT

Disclosed is a system for recirculating exhaust gas in an internal combustion engine having an exhaust gas recirculating conduit which is provided with a valve controlled by two solenoid windings. The system includes a control device including a PID regulator having limitations and cooperating with a three-point switching circuit which exhibits a hysteresis and includes a feedback. The energizing signals for the two solenoid windings are limited between a minimum and a maximum value, whereby the minimum value is defined by the operational sensitivity of the exhaust gas recirculating valve.

12 Claims, 5 Drawing Figures

DEVICE FOR RECIRCULATING EXHAUST GAS IN AN INTERNAL COMBUSTION ENGINE

BACKGROUND OF THE INVENTION

The present invention relates in general to an exhaust gas recirculation system in an internal combustion engine, particularly in a self-ignition type IC engine.

From U.S. Pat. No. 4,177,777 an exhaust gas recirculation control system is known in which the amount of air fed into the internal combustion engine is measured by an air flow sensor and, together with additional possible operational parameters, the measured value is converted into a control signal which varies the control pressure for a pneumatically operated exhaust gas return valve so as to adjust the amount of the recirculating gas. In addition, U.S. Pat. No. 4,177,777 discloses an exhaust gas recirculating system which measures the amount of recirculated exhaust gas and compares the measured value with a desired value generated from the measured volumetric flow rate. The resulting correction signal is used for adjusting the position of the exhaust gas recirculation valve. The first-mentioned step has the disadvantage that the amount of recirculating exhaust gas is controlled without taking into account possible interferences. The second solution requires a measuring arrangement for the actual amount of the recirculating exhaust gas and problems encountered in this solution are sufficiently known. They arise particularly from high temperature of the exhaust gas as well as from the contents of solid particles which make the long-term stability of the exhaust gas measurement extremely problematic.

Similar prior art exhaust gas recirculation systems are known also from U.S. Pat. Nos. 4,164,032, 4,164,206, 4,142,493, 4,173,203, 4,161,929, 4,250,706 and from the German publication DE-OS No. 2,851,180.

SUMMARY OF THE INVENTION

A main object of the present invention is to overcome the disadvantages of prior art exhaust gas recirculation systems.

More particularly, it is an object of the invention to provide an improved system of the aforedescribed kind for use particularly in diesel engines which makes it possible to process on the broadest possible scope the parameters for generating a signal for controlling the exhaust gas recirculation valve so as to facilitate an exact and sensitive volume control.

A further object of the invention is to provide such an improved exhaust gas control system in which a solenoidoperated exhaust gas recirculation valve is employed which requires a reduced number of switching steps and thus is less susceptible to interference.

In keeping with these objects and others which will become apparent hereafter, one feature of the invention resides, in an exhaust gas recirculating system of the aforedescribed kind, for use particularly in a self-ignition-type internal combustion engine having an exhaust gas recirculation conduit provided with a first valve whose position is determined by two solenoid valves each having a solenoid winding in a combination which comprises a control device which is responsive to operational parameters of the engine to produce an energization signal for the two solenoid windings, the control device having a PID regulating behavior with limitations, and a three-state switching circuit conencted to the two solenoid windings.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
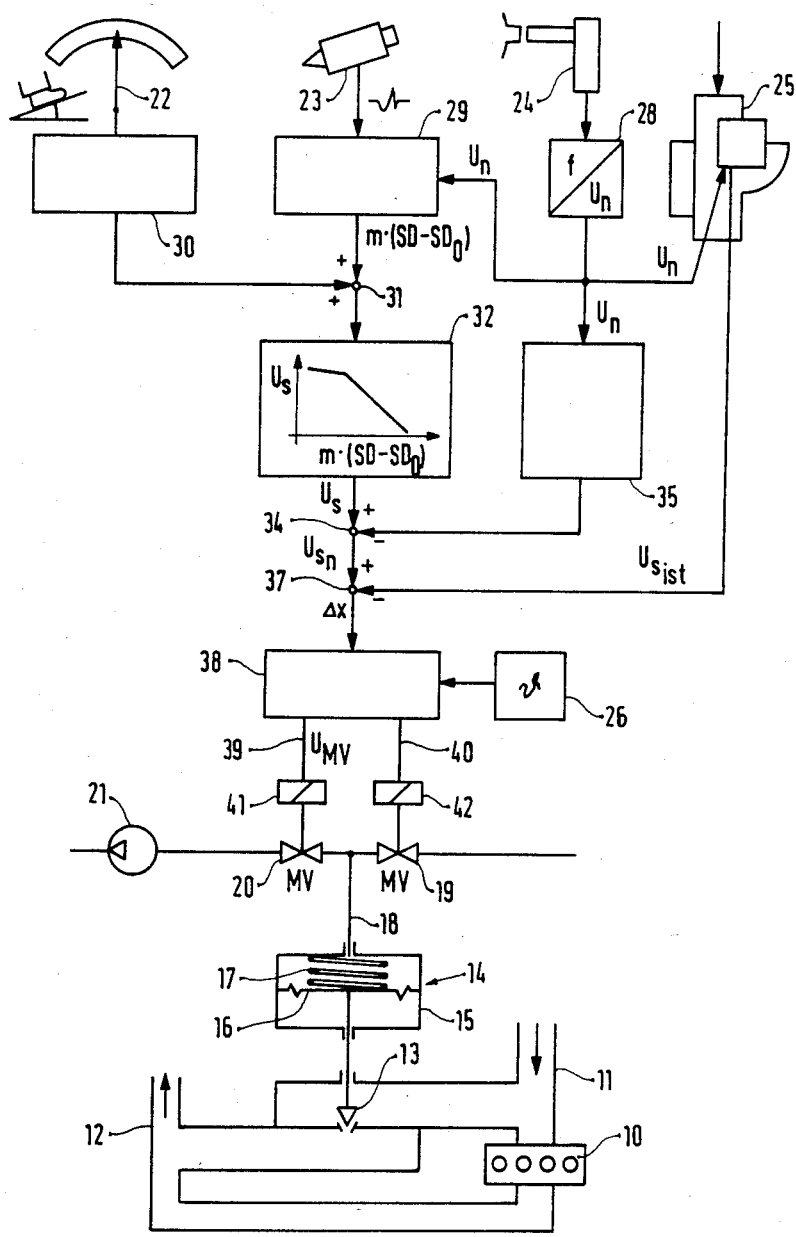
FIG. 1 is a principle circuit diagram of a system for recirculating exhaust gas in a self-igniting internal combustion engine.

Referring firstly to the embodiment of the system for recirculating exhaust gas in a self-igniting internal combustion engine as illustrated in FIG. 1, reference numeral 10 indicates the internal combustion engine, which includes an air induction or intake pipe 11 and an exhaust gas pipe 12. In order to control the recirculation of exhaust gas, a valve 13 is provided between the pipes 11 and 12. The closing or opening position of valve 13 is controlled by means of a pneumatic adjusting device 14. The adjusting device includes a housing 15 which is divided by a diaphragm 16 into two separate chambers. A spring 17 in one chamber holds the diaphragm in a defined position, and the spring force is superimposed upon the pressure difference between the two chambers of the adjusting device 14. The upper or spring chamber is connected to a pneumatic conduit 18. Two solenoid-controlled valves 19 and 20 connect the pneumatic conduit 18 either to the outer atmosphere or to a source of underpressure represented in this example by an underpressure pump 21. The two solenoid control valves 19 and 20 are energized by control pulses generated by a control device which processes various input magnitudes from the engine. In this example, reference numeral 22 indicates a position sensor of an accelerator pedal, reference numeral 23 refers to a sensor of the duration of the fuel injection, reference numeral 24 denotes a rotary speed sensor of the engine, reference numeral 25 indicates a sensor of the amount of air, and reference numeral 26 denotes a temperature sensor. The rotary speed sensor 24 is coupled to a frequency/voltage converter 28, and the fuel injection sensor 23 is coupled to an evaluation unit 29 for the injection duration signal. The latter unit includes a set of characteristic lines which at the output of units 29 derives a signal having a value $$m \cdot (SD - SDO),$$

wherein SD is the measured injection duration, SDO is a constant and m is a multiplication factor.

The accelerator pedal position sensor 22 is connected to an acceleration-determining stage or unit 30. The outputs of the two stages or units 29 and 30 are connected to a summer 31 whose output is connected to a unit 32 including a so-called lambda characteristic line which, depending on the measured fuel injection duration and hence on the amount of fuel fed into the combustion space, determines a basic signal Us indicative of the amount of air. The basic signal Us is applied to a differentiator (difference point) 34 where it can be changed in dependence on the output signal from a rotary speed correction stage or unit 35, into a signal Usn representing the desired value of the amount of air. The latter desired value Usn is subsequently compared in a differentiator (difference point) 37 with a signal Uist representing the actual amount of air as measured in the air flow rate sensor 25. The resulting difference value $\Delta x$ is applied as an input signal to a control device 38 including a PID regulator and a three-point or three-state switching circuit. A second input signal applied to the control unit 38 from the temperature sensor 26. The outputs 39 and 40 of control unit 38 are directly connected to respective solenoid windings 41 and 42 of the two solenoid valves 20 and 19.

The principle idea of the system arrangement according to FIG. 1 is to create, starting from the measured amount of injected fuel, a desired value of the amount of air, and then to regulate this desired value in response to the degree of the admixture of exhaust gas to the component part of fresh air.

Figure 2:
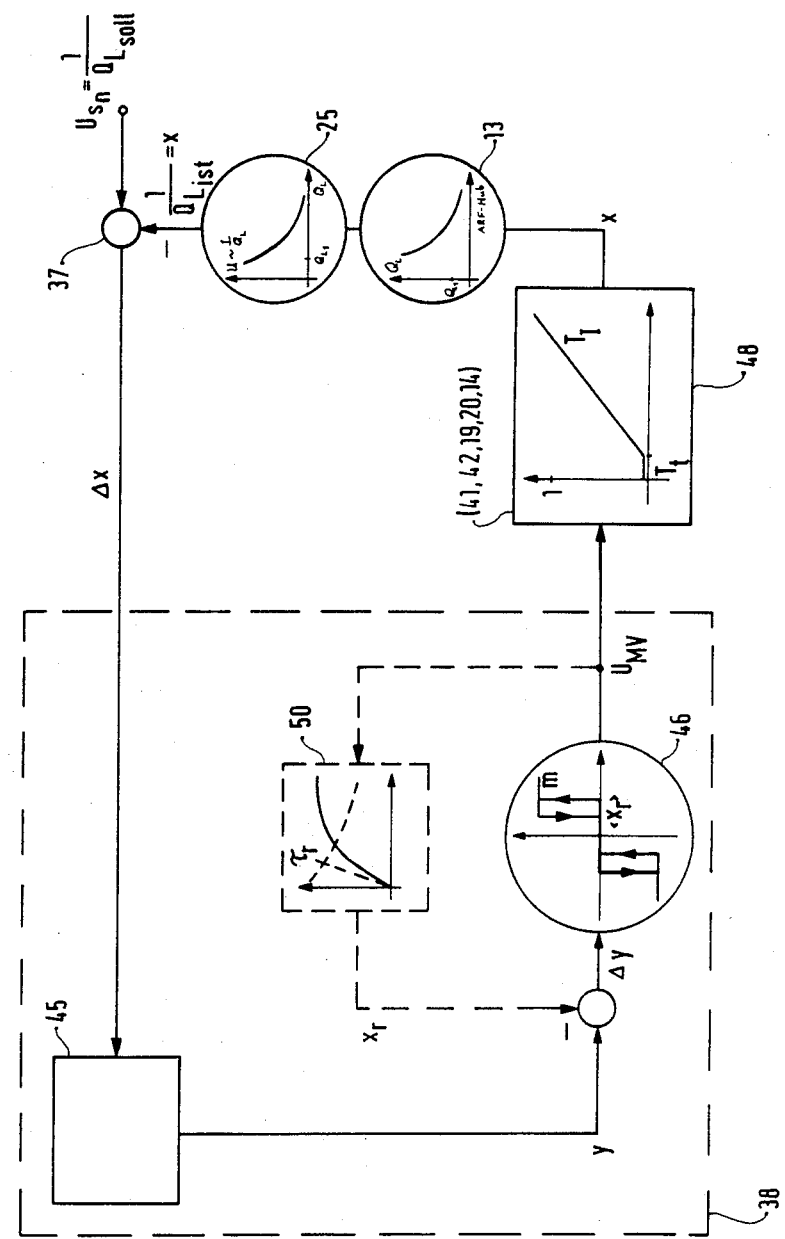
FIG. 2 is a block diagram of a regulating circuit for the exhaust gas recirculation.

FIG. 2 illustrates a block circuit diagram of a regulating circuit for recirculating exhaust gas in the embodiment of FIG. 1. Reference numeral 37 denotes again a difference or comparison point for comparing the desired and actual values of the amount of air. In this specific embodiment, there are illustrated reciprocal desired and actual values of the amount of air. The regulating deviation signal $\Delta x$ determined in this comparison point 37 is applied to the input of a PID regulator 45 in the control unit 38. The PID regulator operates within certain limits and is connected to a three-point switching circuit 46 which will be described in detail below. The output of control unit 38 is connected to a circuit 48 which determines the time behavior of the solenoid valves and of the diaphragm. Circuit 48 is operating in principle as a signal-position converter which in the arrangement according to FIG. 1, in the most adverse case, has an integrating behavior. In the exhaust gas recirculation valve 13, a correlation between the valve position x and the recirculating amount of exhaust gas is adjusted. The higher is the measure of the recirculating exhaust gas, the smaller is the proportion of fresh air due to the pressure condition in the suction pipe, and vice versa. This condition is illustrated in FIG. 2 by a characteristic curve QL plotted over the stroke u of the exhaust gas recirculation valve 13. The regulating loop closes via the air volume sensor 25 which delivers an output signal which is proportional to the reciprocal value of the amount of air corresponding to the actual value signal of the air volume which is applied to the input of comparison point 37. The corresponding desired value signal is designated in FIG. 1 by a signal Usn and, as mentioned before, the difference between the desired and actual values results in a regulating deviation $\Delta x$ which is applied as an input magnitude to the PID regulator 45.

Characteristic features of the three-point switching circuit 46 are its dead zone and its hysteresis, whose dimensions will be explained in greater detail below. In addition, FIG. 2 illustrates a unit 50 for simulating the adjustment member. The input signal of the unit 50 corresponds to the excitation signal of the two solenoid windings 41 and 42 for the solenoid valves 19 and, 20. The output of unit 50 supplies an additional delayed signal to the input of the three-point switching circuit 46 (the so-called flexible feedback).

The PID regulator 45 operates as a linear one and is active only within the dead zone of the subsequent three-point switching circuit 46. For small regulating deviation $\Delta x$ the regulator 45 determines the switching frequency of the individual solenoid valves. Within the dead zone or within the hysteresis loop, the three-point switching circuit 46 does not pass any change to the adjusting mechanism. Only if the output signal of the PID regulator 45 exceeds a limit value, then one of the two solenoid valves 19 and 20 is switched on, and the diaphragm 16 of the adjusting device 14 is displaced with a time constant TI. As a consequence, the unit 48 in FIG. 2 behaves as an I-member.

The hysteresis of the three-point switching circuit 46 prevents continuous back-and-forth switching of the valves 19 and 20, so that the consumption of underpressure from the source 21 is reduced, and the service life of the valves is increased. The size of the hysteresis is determined from the present interference band. The dead zone of the circuit 46 is determined from the desired accuracy and from the P-amplification of the regulator 45.

The feedback of the output signal from the three-point switching circuit represents an auxiliary regulating magnitude. It simulates the reaction of the adjusting member in the manner of a monitor, so as to improve its stability. In this manner the feedback prevents an excessive overswing of the regulating loop. The simulation unit 50 has therefore no PID behavior, and only in the case in which only a minimum correction is required it determines with the time constant of the increase of the fed back signal the proper minimum width of setting pulses. For smaller switching frequency, the damping time constant of the feedback is larger than the time constant of the increase of the feedback.

The time behavior of the PID regulator 45 does not take any direct effect on the adjusting member, that means on the valve 13; nevertheless, it influences the behavior of small signals and the switch frequency. It is of particular importance how the regulator reacts on crossing a switching threshold. For example, if within the dead zone the I-regulator integrates a barely detectable regulating deviation $\Delta x$, then only the smallest possible setting pulse should take effect.

Figure 3:
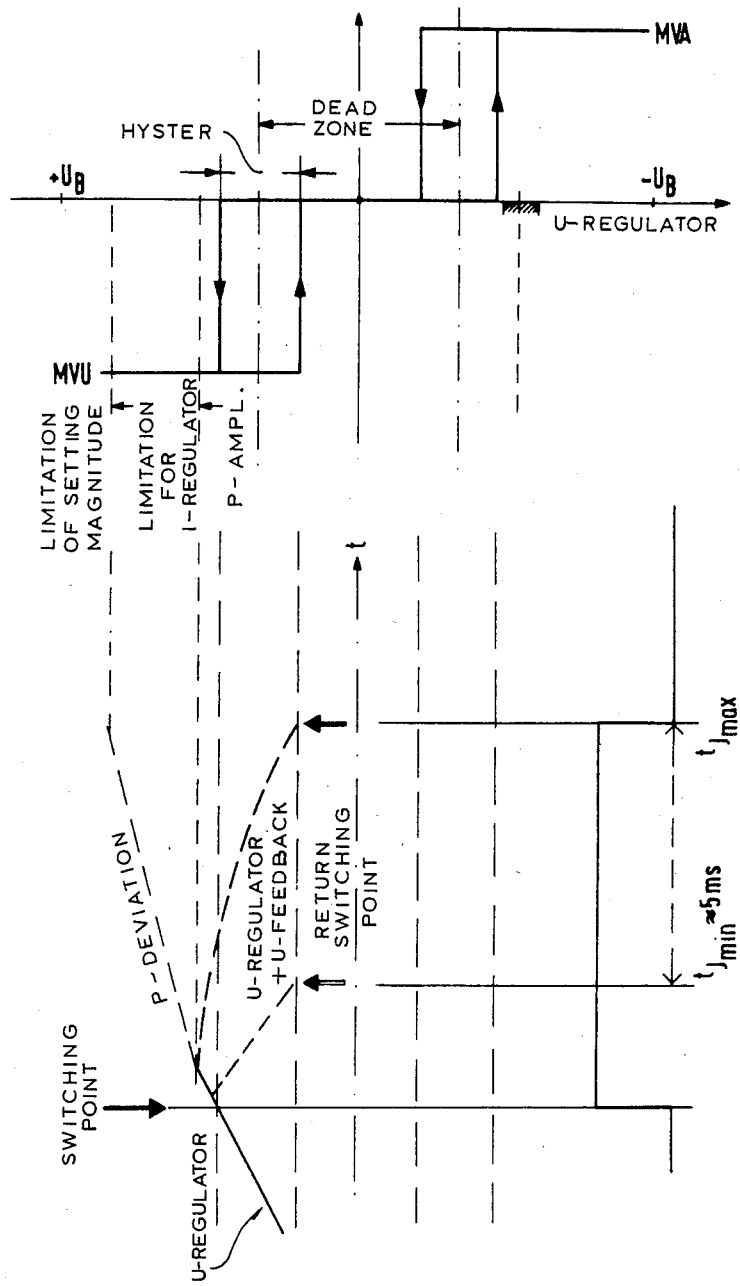
FIG. 3 is a time plot of pulses forming control signals for energizing the two solenoid windings and limiting the PID regulator.
Figure 4:
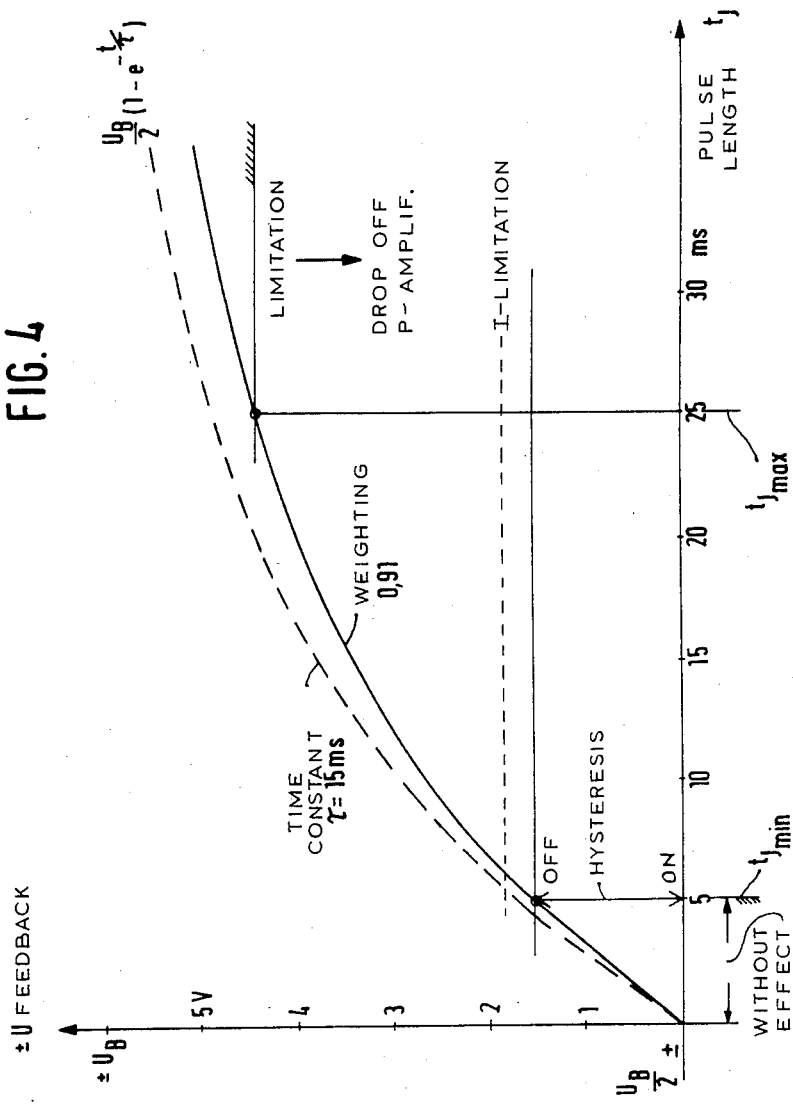
FIG. 4 is a time plot of a simulation signal of the valve and of the limitation ranges.

In order to keep the PID regulator as close as possible to its optimum operational range subsequent to a switching point, its I-part is limited shortly after the crossing of a switching threshold. At larger regulating deviations, the P- and D-parts can continue their operation up to a later limitation. This is illustrated in detail in the plot diagram in FIG. 3 which depicts the signals of the PID regulator 45 together with its limitations as well as the switching behavior of the three-point switch circuit 46. The determination of minimum and maximum lengths of pulses will be explained with reference both to FIG. 3 and to FIG. 4.

When the length of energization pulses is smaller than $t_{min}$, the valves 19 and 20 does not yet mechanically open. For the minimum effective impulse length the following considerations are valid: At a fixed hysteresis, the time constant and the evaluation of the recirculation (via the actuation member simulating unit 50) is defined such that the feedback voltage after a period of $t_imin$ reaches exactly the value of the hysteresis, as will be seen from the corresponding plots in FIGS. 3 and 4. Accordingly, at a minimum regulating deviation, the least possible correction step takes effect. Only when the regulating deviation has a larger value is the feedback voltage exceeded, depending on the magnitude of the P-amplification outside the dead zone and correspondingly longer pulses are switched over.

At an absolute limitation of the regulator 45, a maximum pulse length $t_imax$ is determined. This maximum length, however, must be selected so that no continuous oscillation be generated. Accordingly, the pulse lengths are limited to the range between $t_imin$ and $t_imax$ and are oriented according to the magnitude of the regulating deviation.

Figure 5:
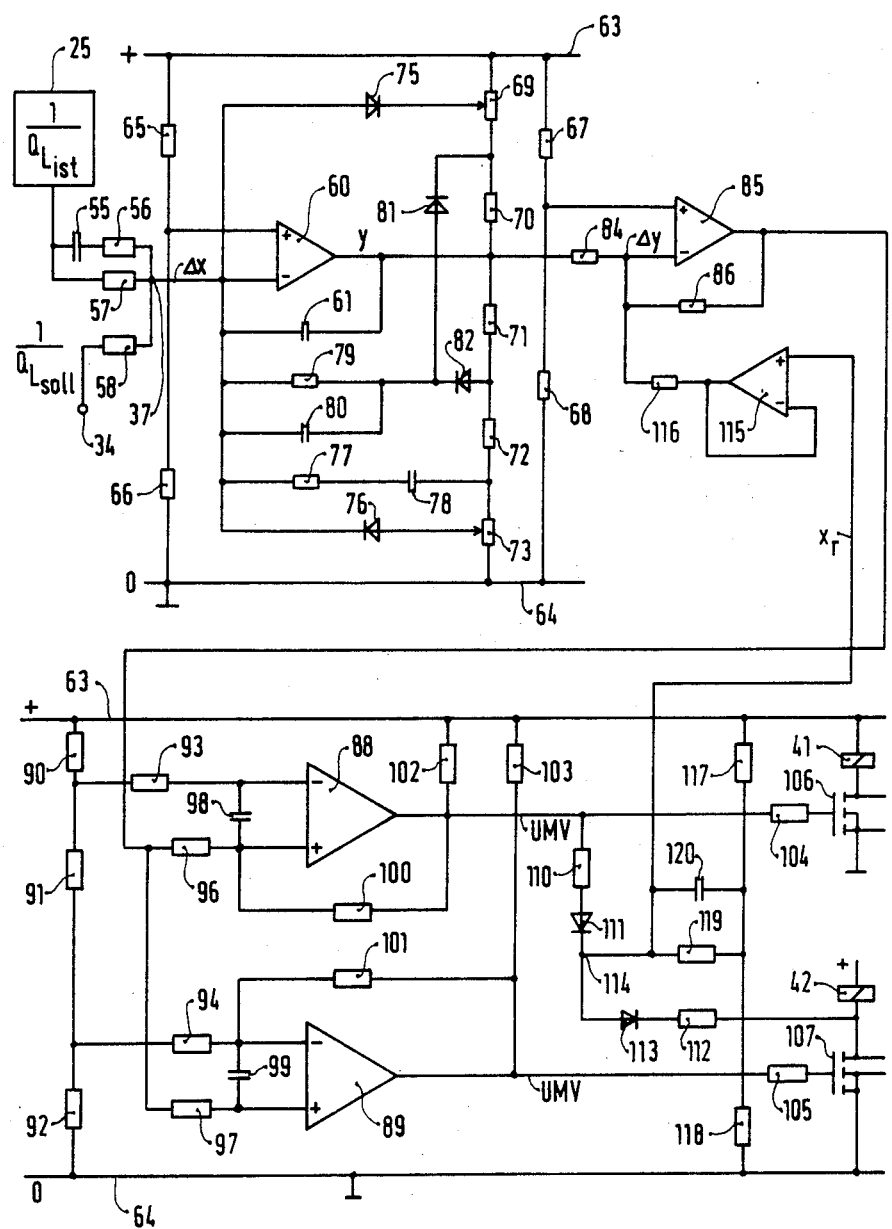
FIG. 5 is a circuit diagram of a PID regulator together with the subsequent three-point switching circuit and with the governor of the final stage.

An exemplary embodiment of a control device 38 of FIGS. 1 and 2 is illustrated in FIG. 5. It will be noted that FIG. 5 shows again two excitation or solenoid windings 41 and 42 pertaining to respective solenoid valves as shown in FIG. 1, whereas FIG. 2 for the sake of simplicity shows only one of the two output conductors (39, 40) with the output signal UMV.

The circuit diagram of FIG. 5 thus represents a PID regulator 45 together with its limitations, a three-point switching circuit including two comparators, a flexible switching pulse feedback representing the actuating member simulating unit, and finally two driving or end stages for generating energization signals for the two solenoid windings 41 and 42.

The detailed construction of the circuit of FIG. 5 is as follows:

Between the amount of air sensor 35 and the differentiating point 37, there is provided a D-member consisting of a series connection of capacitor 55 and resistor 56 and of a resistor 57 connected parallel to this series connection. The signal representing the desired value of the amount of air is applied via resistor 58 to the difference point 37.

The main part of a PID regulator 45 is an operational amplifier 60 provided with a negative feedback capacitor 61 between its input and output. Between the power supply conductors 63 (+ pole) and 64 (ground), there are connected two single-stage voltage dividers consisting of resistors 65 and 66, and 67 and 68, and a multi-stage voltage divider consisting of five resistors 69–73. The difference or subtraction point 37 is connected immediately to the inverting (minus) input of the operational amplifier 60. This inverting input is also connected via antiparallel-oriented diodes 75 and 76 to sliding arms of potentiometers 69 and 73 in the multi-stage voltage divider. A series connection of a resistor 77 and a capacitor 78 is provided between the inverting (−) input of the amplifier 60 and the connecting point of resistors 72 and 73. Furthermore, a combination of an RC member 79, 80 is connected to the inverting input of the amplifier and via a diode 81 to the connection point between resistors 69 and 70 and another diode 82 to the connecting point between resistors 71 and 72. The output of operational amplifier 60 is connected to the connection point between resistors 70 and 71, which thus represents the output of the PID regulator 45 with its limitations. This output point is connected via resistor 84 to the difference point 37 (FIG. 1) which lies at the input of a three-point switching circuit 36 and at whose output a regulating deviation signal $\Delta x$ is generated.

This difference point 37 is constituted by the inverting (−) input of another operational amplifier 85, whose non-inverting (+) input is connected to the connection point of the voltage divider 67, 68. A feedback resistor 86 is connected between the inverting input and the output of the amplifier 85.

The three-point switching circuit 46 of FIG. 2 is represented in FIG. 5 by two threshold value switches in the form of comparators 88 and 89. A two-stage voltage divider including three resistors 90–92 generates the threshold values for the two comparators 88 and 89, whereby a resistor 93 connects the connection point of resistors 90 and 91 to the inverting input of the threshold value switch 88, and a resistor 94 connects non-inverting the connection point between resistors 91 and 92 to the non-inverting input of the second threshold value switch 89. The non-inverting (+) inputs of threshold value switches 88 and 89 are connected via resistors 96 and 97 to the output of the operational amplifier 85. Feedback resistors 100 and 101 connect the output of respective threshold value switches 88 and 89 to their non-inverting inputs and both inputs of each of the threshold value switches are interconnected by capacitors 98 and 99. The outputs of respective threshold value switches 88 and 89 are connected via resistors 102 and 103 to the + conductor 63 of the power supply, and via resistors 104 and 105 to the respective gate terminals of field-effect transistors 106 and 107. The source terminals of the two field-effect transistors are connected ground, while the solenoid excitation windings 41 and 42 of the solenoid valves 19 and 20 are connected between the + pole conductor 63 and the drain terminal of the field-effect transistors.

In order to realize the adjusting member's simulation unit 50 (in FIG. 2), there is provided a network of resistors, capacitors and diodes. A series connection of resistor 110 and a diode 111 leads from the output of the threshold value switch 88, and another series connection of a resistor 112 and a diode 103 leaves from the drain terminal of field-effect transistor 107 to a connection point 114 at which a signal xr (FIG. 2) occurs and which is connected via an impedance converter including an operational amplifier 115 and via a resistor 116 to the inverting input of the operational amplifier 85. In addition, the connection point 114 is connected via a parallel connection of a resistor 119 and a capacitor 120 to a tapping point of a voltage divider consisting of two resistors 117 and 118.

The operation of the circuit arrangement of FIG. 5 is as follows:

The operational amplifier 60 interconnected as a PID regulator receives a limitation of its integrating part when its output voltage reaches a voltage difference relative to one side of the multi-stage divider at which one of the diodes 81 and 82 becomes conductive depending on the value at the voltage divider 69 and 70 or 71–73. As a result, the branch with the capacitor 80 and resistor 79 is switched on parallel to the PI branch 77, 78, whereby a time-delayed P regulator results having a reduced amplification corresponding to the value of resistor 79. Capacitor 80 connected parallel to the resistor 79 damps the regulator against continuous oscillations which at lower rotary speeds might interfere with the exhaust gas recirculation. The integration time constant (C78) is trimmed according to the desired speed of regulation.

The adjusted tapping points at potentiometers 69 and 73, which lead via diodes 75 and 76 to the inverting input of the operational amplifier 60, adjust the total limitation of the regulator for the maximum pulse length.

The D-component of regulator 45 is generated at the input for the actual value (capacitor 55 and resistance 56). The output voltage of regulator 60 is compared at the summing amplifier 85 with the signal fed back from the outputs of threshold value switches 88 and 89, and the difference signal is applied to the two threshold value switches 88 and 89 of the three-point switching circuit. The so-called dead zone of this three-point switching circuit is determined by the combination of resistors 90–92, and the hysteresis is determined by the selection of resistors 110 and 96 as well as 101 and 94. The two switching outputs of threshold value switches 88 and 89 control final stages with the field-effect-transistors 106 and 107 and with correct polarity the two timing members of the actuation member simulator. The reverberation period of the timing member is determined via diodes 111 and 113 by resistors 110 and 112 and the capacitor 120. The reverberation time is dependent on the values of the capacitor 120 and resistor 119, whereby the resistor has a substantially higher value than the two resistors 110 and 112. The simulation signal is applied from the timing member via the impedance converter (operational amplifier 115) and via a weighting resistor 116 to a summing point at the inverting input of the operational amplifier 85 to which the output signal from the PID regulator is also applied.

In summary, the characteristic features of this invention are as follows:

The PID regulator 45 as well as the three-point switching circuit 46 have a limitation of setting or adjusting magnitudes; at the same time, the switching time is defined by means of a switching hysteresis and by time constants of the fedback actuation member simulation signal. By virtue of these measures, it is achieved that the regulating circuit is stabilized at all working points, even at variable operational parameters.

The magnitude of the dead time of the three-point switching circuit is determined by the desired accuracy and amplification factor.

The magnitude of switching hysteresis is set with respect to the existing interference band and serves also for the definition of the switching time.

The feedback of the setting or adjusting pulses, that is the output signal of the three-point switching circuit 46 is performed with different time constants for the switching and reswitching moment and affects the switching frequency. The minimum pulse length is influenced by the time constant of the feedback at the moment of switching as well as by the weighting of the feedback. It is measured according to the smallest pulse length at which a mechanical effect still occurs and forms therefore the least correction step.

The maximum pulse duration is smaller than that which would cause a permanent oscillation and is determined by the limitation of the output of the PID regulator.

The time behavior of the PID regulator 45 is independent from the magnitude of the regulating deviation $\Delta x$. The P amplification is computed according to requirements of stability, the I component according to the accuracy within the dead zone whereby a compromise has to be made between the necessary damping and the speed of regulation.

Regarding the limitation of the regulator, it holds true that the I component is closely limited outside the dead zone as it is of advantage for suppressing low-frequency sawtooth oscillations. For this purpose also the P amplification is reduced. In order to limit the maximum pulse length, the regulator at a further distance from the dead zone is completely limited (see FIGS. 3 and 4). The limitation of the I component prevents excessive running away of the I regulator due to the dead time behavior of the regulating path or due to excessive time delays. For this reason the I range is selected only so large as is necessary to ensure the required accuracy.

It will be understood that each of the elements described above, or two or more together, may also find a useful application in other types of constructions differing from the types described above.

While the invention has been illustrated and described as embodied in a specific example of the system for recirculating exhaust gas in a diesel engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for recirculating exhaust gas in an internal combustion engine, particularly a self-ignition type engine having an acceleration pedal and an exhaust gas recirculation conduit provided with a first valve movable in two opposite directions between recirculation controlling positions, comprising a pneumatic adjusting device for adjusting a position of the first valve; two solenoid valves for selectively connecting the pneumatic adjusting device to a source of underpressure or to outer atmosphere; each of the solenoid valves having a solenoid winding; a control device responsive to operational parameters of the engine to produce an energization signal for the windings of the two solenoid valves, said control device having a PID regulating behavior with limitations and a three-point switching circuit with a feedback connected to the two solenoid windings to actuate the two solenoid valves into one of three switching states, whereby in a first switching state one of the solenoid valves is switched on, the other solenoid valve is switched off and the position of the first valve is changed in one direction, in a second switching state the one solenoid valve is switched off, the other solenoid valve is switched on and the position of the first valve is changed in the opposite direction, and in a third switching state the two solenoid valves are switched off and the position of the first valve remains unchanged; the recirculated exhaust gas being regulated according to a desired value which is determined from a desired amount of fresh air which in turn is determined from a load signal and rotary speed signal of the engine, the load signal corresponding to a duration of actuation of a fuel injecting valve, and a fuel injection time signal being corrected by a correction signal derived in dependence on rotary speed of the engine, the correction signal being derived from an actual position of the accelerator pedal and being superposed to the load signal to generate a corrected load signal, and the corrected load signal being applied as an input magnitude to a lamda characteristic curve unit at whose output signal is derived which corresponds to the desired amount of fresh air.

2. A system for recirculating exhaust gas in an internal combustion engine, particulurly a self-ignition type engine having an accelerator pedal and an exhaust gas recirculation conduit provided with a first valve movable in two opposite directions between recirculation controlling positions, comprising a pneumatic adjusting device for adjusting a position of the first valve; two solenoid valves for selectively connecting the pneumatic adjusting device to a source of underpressure or to outer atmosphere; each of the solenoid valves having a solenoid winding; a control device responsive to operational parameters of the engine to produce an energization signal for the windings of the two solenoid valves, said control device having a PID regulating behavior with limitations and a three-point switching circuit with a feedback whose damping time constant is larger than a time constant of an increase of a feedback signal, the three point switching circuit being connected to the two solenoid windings to actuate the two solenoid valves into one of three switching states whereby in a first switching state one of the solenoid valves is switched on, the other solenoid valve is switched off and the position of the first valve is changed in one direction, in a second switching state the one solenoid valve is switched off, the other solenoid valve is switched on and the position of the first valve is changed in the opposite direction, and in a third switching state the two solenoid valves are switched off and the position of the first valve remains unchanged; and means for introducing a time delay in the feedback.

3. A system for recirculating exhaust gas in an internal combustion engine, particularly a self-ignition type engine, having an exhaust gas recirculation conduit provided with a first valve movable in two opposite directions between recirculation controlling positions, comprising a pneumatic adjusting device for adjusting a position of the first valve; two solenoid valves for selectively connecting the pneumatic adjusting device to a source of underpressure or to outer atmosphere, each of the solenoid valves having a solenoid winding; a control device responsive to operational parameters of the engine to produce an energization signal for the windings of the two solenoid valves, said control device having a PID regulating behavior with limitations and a three-point switching circuit with a feedback connected to the two solenoid windings to actuate the two solenoid valves into one of three switching states, in a first switching state one of the solenoid valves is switched on, the other solenoid valve is switched off and the position of the first valve is changed in one direction, in a second switching state the one solenoid valve is switched off, the other solenoid valve is switched on and the position of the first valve is changed in the opposite direction, and in a third switching state both solenoid valves are switched off and the position of the first valve remains unchanged.

4. A system as defined in claim 3, and further comprising means for introducing a time delay in the feedback.

5. A system as defined in claim 3, wherein said operational parameters of the engine include at least two parameters selected from the group consisting of a accelerator pedal position, rotary speed of the engine, volumetric flow rate of air in a suction pipe, fuel injection duration and temeprature.

6. A system as defined in claim 3, wherein said energization signal fed to solenoid windings are switching pulses generated between a minimum and maximum level depending on operational behavior of the first valve for recirculating exhaust gas and on overall behavior of the entire system.

7. A system as defined in claim 3 wherein said control device has seperate limitations for the I and the P component of its PID regulating behaviour.

8. A system as defined in claim 3, wherein the proportion of the recirculated exhaust gas is regulated according to a desired value which is determined from a required amount of fresh air which in turn is determined from a load signal and a rotary speed signal of the engine.

9. A system as defined in claim 8, wherein the load signal of the engine corresponds to a duration of actuation of a fuel injecting valve and a fuel injection time signal is corrected in dependence on the rotary speed signal.

10. A system as defined in claim 3, wherein said three-point switching circuit exhibits an hysteresis.

11. A system as defined in claim 10, wherein said control device includes a signal processing unit coupled to said three-point switching circuit via said feedback.

12. A system as defined in claim 11, further comprising means for introducing a time delay in the feedback.

* * * * *